(12) United States Patent
Shane (10) Patent No.: US 11,647,693 B2
(45) Date of Patent: May 16, 2023

(54) STOMPING SHOE ASSEMBLY FOR AN AGRICULTURAL HARVESTER HEADER

(71) Applicant: CNH Industrial America LLC, New Holland, PA (US)

(72) Inventor: Nicholas Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 193 days.

(21) Appl. No.: 16/684,025

(22) Filed: Nov. 14, 2019

(65) Prior Publication Data
US 2021/0144921 A1     May 20, 2021

(51) Int. Cl.
*A01D 34/835*     (2006.01)
*A01D 45/02*     (2006.01)
*A01D 47/00*     (2006.01)

(52) U.S. Cl.
CPC ......... *A01D 47/00* (2013.01); *A01D 34/8355* (2013.01); *A01D 45/021* (2013.01); *A01D 45/028* (2013.01)

(58) Field of Classification Search
CPC .... A01D 34/8355; A01D 45/02; A01D 34/22; A01D 75/00; A01D 45/021; A01D 23/00–23/06; A01D 27/00–27/04; A01B 17/002; A01B 61/046; A01B 39/02; A01B 39/18
See application file for complete search history.

(56) References Cited

U.S. PATENT DOCUMENTS

| | | | | |
|---|---|---|---|---|
| 843,479 A * | 2/1907 | Ma Callejas Y Becerra | | A01D 34/8355 56/504 |
| 1,068,986 A * | 7/1913 | Dawson | | A01D 23/02 56/121.46 |
| 1,261,150 A * | 4/1918 | Mountjoy | | A01B 17/002 172/515 |
| 1,454,580 A * | 5/1923 | Foss | | A01B 39/18 171/99 |
| 1,458,615 A * | 6/1923 | Boyle | | A01D 23/02 301/132 |
| 1,747,525 A * | 2/1930 | Nagy | | A01C 5/06 111/71 |
| 1,795,182 A * | 3/1931 | Ross | | A01B 27/00 172/55 |
| 2,068,467 A * | 1/1937 | Paus | | A01B 39/26 172/182 |

(Continued)

FOREIGN PATENT DOCUMENTS

| | | | | |
|---|---|---|---|---|
| DE | 102007049377 A1 * | 4/2009 | | A01D 23/02 |
| EP | 0898869 A1 * | 3/1999 | | |
| WO | 2016109714 A1 | 7/2016 | | |

OTHER PUBLICATIONS

Yetter Co., "Yetter Farm Equipment—Yetter Stalk Devastator", Nov. 13, 2018, pp. 1-10, Yetter Manufacturing Company.

*Primary Examiner* — Alicia Torres
*Assistant Examiner* — Madeline I Runco
(74) *Attorney, Agent, or Firm* — Peter Zacharias; Patrick Sheldrake (57) ABSTRACT

A stomping shoe assembly for an agricultural harvester header including a stomping shoe having a substantially planar proximal end for connecting to an agricultural harvester header, and a curved distal end for engaging crop. The assembly further includes a stalk cutter having an elongated body mounted to the stomping shoe and extending from the stomping shoe from the curved distal end to the substantially planar proximal end. Also provided is an agricultural harvester header including the stomping shoe assembly.

11 Claims, 13 Drawing Sheets

(56) References Cited

U.S. PATENT DOCUMENTS

| | | | | |
|---|---|---|---|---|
| 2,319,520 A | * | 5/1943 | Rypkema | E01H 5/12 |
| | | | | 299/25 |
| 2,487,609 A | * | 11/1949 | Sparks | A01B 17/00 |
| | | | | 172/515 |
| 3,233,683 A | | 2/1966 | Lofshult | |
| 3,984,966 A | | 10/1976 | Outtier | |
| 4,217,835 A | * | 8/1980 | Fox | A01C 7/203 |
| | | | | 111/158 |
| 4,942,833 A | * | 7/1990 | Hill | A01B 45/00 |
| | | | | 111/121 |
| 5,161,356 A | | 11/1992 | Pick | |
| 5,941,316 A | | 8/1999 | Mansur | |
| 6,539,697 B2 | | 4/2003 | Burk | |
| 7,658,058 B2 | | 2/2010 | Pierson | |
| 7,997,218 B2 | * | 8/2011 | Gengler | A01C 5/064 |
| | | | | 111/164 |
| 8,567,167 B2 | | 10/2013 | Shoup | |
| 8,813,865 B2 | * | 8/2014 | Renyer | A01C 5/064 |
| | | | | 172/518 |
| 9,095,093 B2 | | 8/2015 | Hyronimus | |
| 9,295,196 B2 | | 3/2016 | Surmann et al. | |
| 9,730,374 B2 | | 8/2017 | Wick | |
| 9,743,587 B2 | | 8/2017 | Lohrentz | |
| 2013/0061569 A1 | | 3/2013 | McClenathen | |
| 2015/0096773 A1 | | 4/2015 | Miller et al. | |
| 2015/0250098 A1 | | 9/2015 | Vandeven | |
| 2016/0066504 A1 | | 3/2016 | Holman | |
| 2018/0042180 A1 | | 2/2018 | Shane et al. | |

* cited by examiner

STOMPING SHOE ASSEMBLY FOR AN AGRICULTURAL HARVESTER HEADER

The exemplary embodiments of present invention relate generally to a stomping shoe assembly for a header of a plant cutting machine (e.g., a combine harvester) and, more specifically, to a stomping shoe assembly having a stalk cutter mounted to and extending from a stomping shoe.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. When used for processing stalk plants such as corn, the header has a stalk stripping mechanism, e.g., a plurality of row units, for stripping ears of corn from their stalks. After the ears of corn are stripped by the row units, they are collected inside the header and transported via a conveyor such as a draper belt or auger towards a feederhouse located centrally of the header through which ears of corn are passed to the harvester to undergo further processing.

After a field of corn is processed in this manner, the stripped stalks remain behind in the field. Farmers typically leave the stripped stalks in the field between plantings to assist in controlling erosion of ground soil from wind and rain and to provide a natural fertilizer for subsequent crops after decomposition. However, since the stripped stalks remain standing, they interfere with the planting of subsequent crops. For this reason, farmers typically employ various methods for knocking down or chopping stripped stalks after harvesting a field of corn.

While such methods may be effective at clearing stripped stalks of corn before a subsequent planting, they require working the field a second time, which is very time consuming and labor intensive. Further, such methods typically require extensive amounts of power. These disadvantages increase the cost of corn production.

SUMMARY OF THE INVENTION

In accordance with an exemplary embodiment there is provided a stomping shoe assembly for an agricultural harvester header including a stomping shoe having a substantially planar proximal end for connecting to an agricultural harvester header, and a curved distal end for engaging crop. The assembly further includes a stalk cutter having an elongated body mounted to the stomping shoe and extending from the stomping shoe from the curved distal end to the substantially planar proximal end.

In accordance with another exemplary embodiment there is provided a header for an agricultural harvester comprising a chassis configured to mount to a forward end of the agricultural harvester, a row unit mounted to the chassis for processing crop, and a stomping shoe assembly mounted to the chassis. The stomping shoe assembly comprises a stomping shoe having a substantially planar proximal end connected to the chassis and a curved distal end for engaging crop. The assembly further includes a stalk cutter having an elongated body mounted to the stomping shoe and extending from the stomping shoe from the curved distal end to the substantially planar proximal end.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
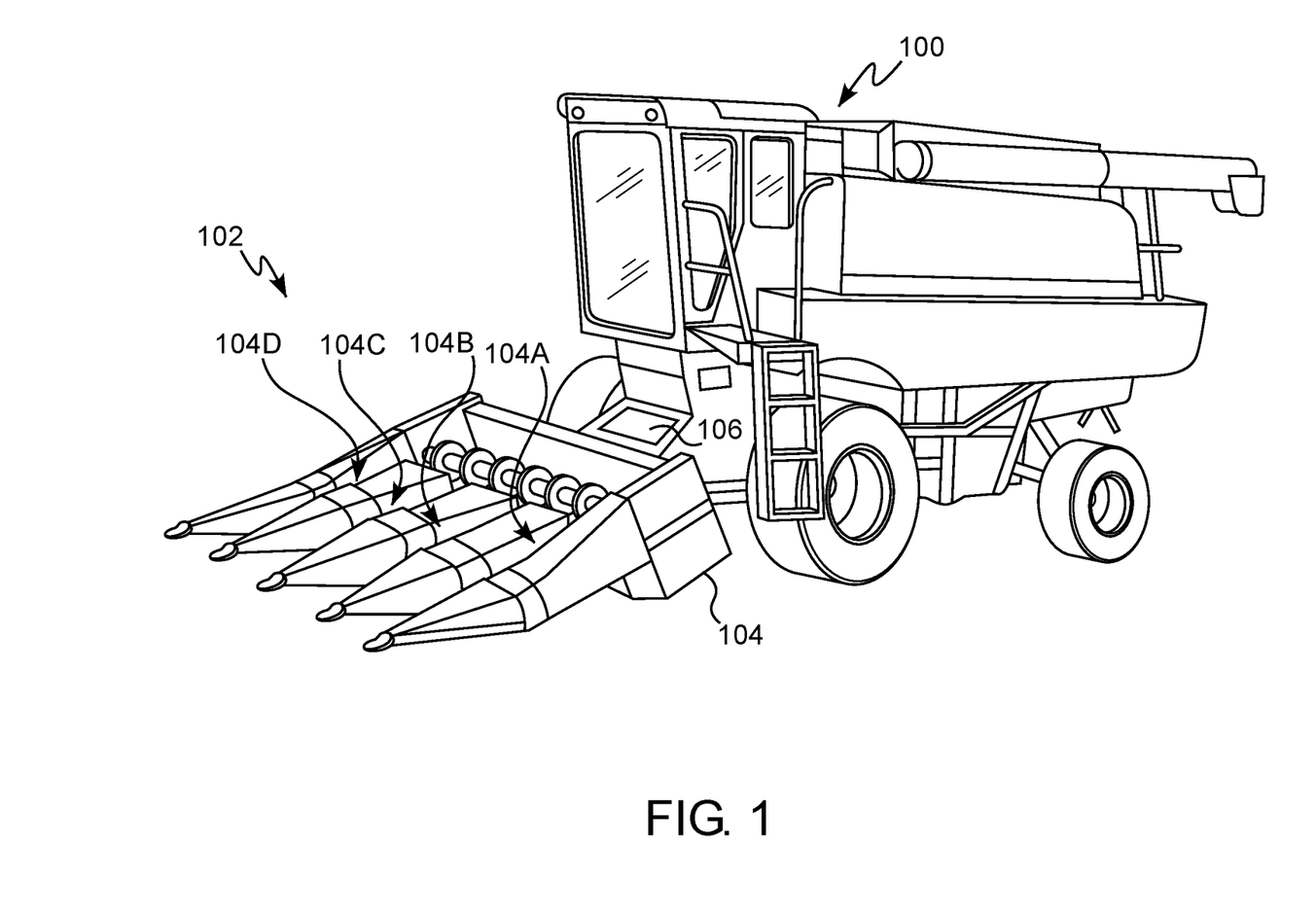
FIG. 1 is a perspective view of an agricultural harvester including a header in accordance with an exemplary embodiment of the subject disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester 100, which is configured to process crops, including (without limitation) corn. The header includes a plurality of row units 104A, 1048, 104C and 104D mounted to a chassis or frame 104 of the header. The row units are spaced apart substantially in accordance with the spacing of a row of corn stalks (not illustrated). The row units strip ears of corn from the corn stalks in the known manner and induct the cut crops into a feederhouse 106 as the harvester moves forward over a crop field.

Figure 2:
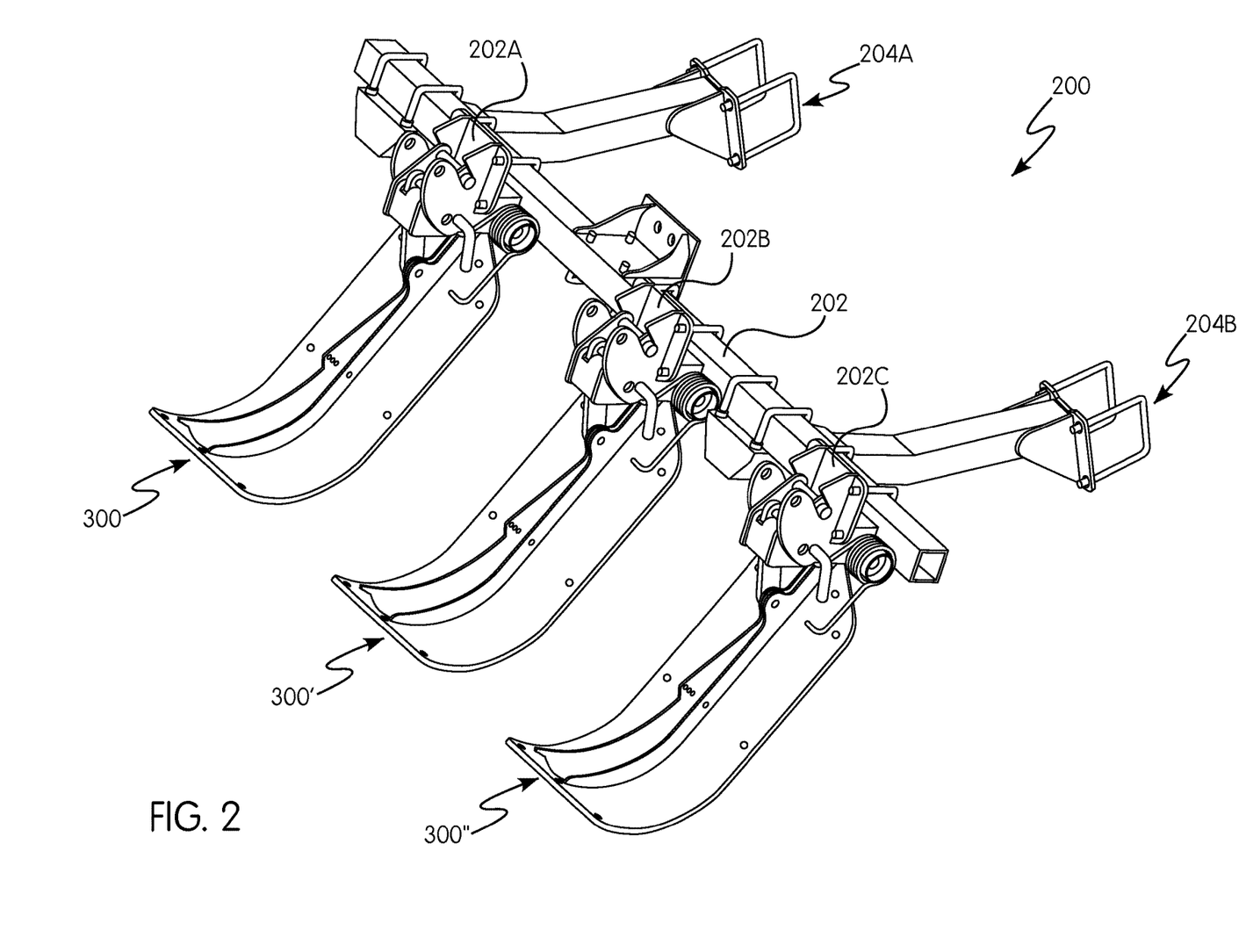
FIG. 2 is a perspective view of a first exemplary embodiment of a stomping shoe assembly and structure for mounting the stomping shoe assembly to a header suitable for use with the agricultural harvester header of FIG. 1.

Referring now to FIG. 2, there is illustrated a mounting assembly 200 for mounting stomping shoe assemblies in accordance with the exemplary embodiment to a header chassis such as chassis 104 of FIG. 1. Mounting assembly 200 includes a plurality of stomping shoe assemblies 300, 300' and 300" coupled to an intermediate frame member 202 via respective mounting brackets 202A, 202B, and 202C. The intermediate frame member 202 is configured to couple to the frame 104 of the header via mounting points 204A and 204B such that each of stomping shoe assemblies 300, 300' and 300" is positioned inline and behind an associated row unit for flattening stalks of corn after the stalks are processed by the row units. In accordance with an alternative aspect, stomping shoe assemblies 300, 300' and 300" may be coupled directly to the frame of a corn header without need for intermediate frame member 202.

As shown in FIG. 2, the mounting assembly 200 is intended to be used with a corn header having three row units. However, it should be appreciated that mounting assembly 200 may be sized and configured to include any number of stomping shoe assemblies to match corn headers having a commensurate number of row units. For example, mounting assembly 200 may be sized and configured to include eight stomping shoe assemblies to accommodate corn headers with eight row units. Alternatively, multiple mounting assemblies 200 may be mounted to a corn header in modular fashion to accommodate a certain number of row units. For example, two modular mounting assemblies, each with three stomping shoe assemblies may be mounted to a corn header having six row units.

Figure 3:
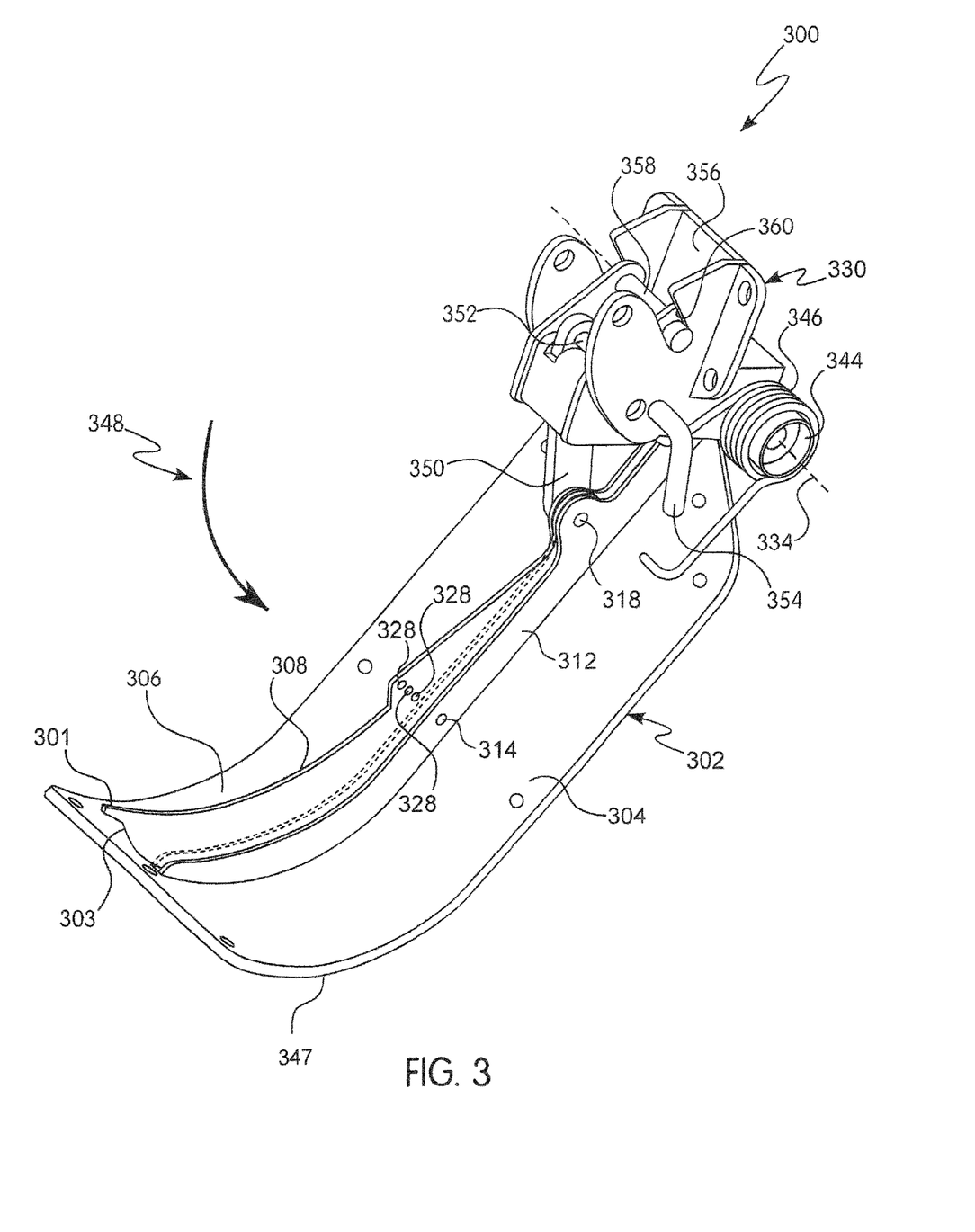
FIG. 3 is a perspective view of the stomping shoe assembly of FIG. 2 showing a stalk cutter of the stomping shoe assembly in a first position relative to a stomping shoe of the stomping shoe assembly.
Figure 6:
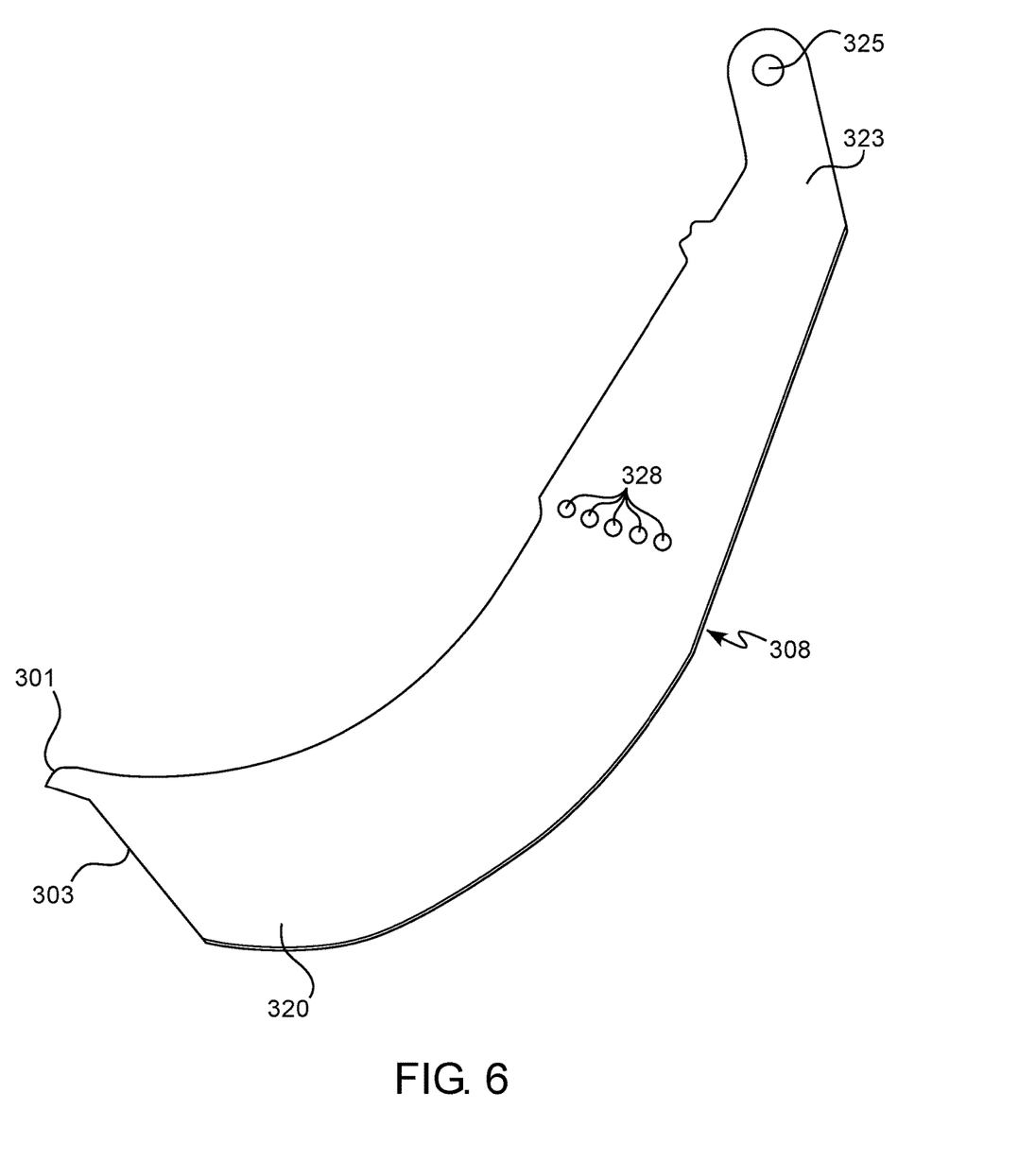
FIG. 6 is a side view of the stalk cutter of the stomping shoe assembly of FIG. 4.

FIG. 3 shows on an enlarged scale the construction of a first exemplary embodiment of a stomping shoe assembly 300 according to the present disclosure. Stomping shoe assembly 300 comprises a stomping shoe 302 having a substantially planar proximal end 304 for connecting to the agricultural harvester header 102. The stomping shoe 302 also has a curved distal end 306, for engaging crop, which is contiguous with the planar proximal end 304. The stomping shoe assembly 300 further comprises a stalk cutter 308 having an elongated body mounted to the stomping shoe 302. The stalk cutter extends along the stomping shoe from the curved distal end 306 to the substantially planar proximal end 304. As shown in FIGS. 3 and 6, the stalk cutter 308 is provided at its distal end with a stop 301 and a notch 303. The stop 301 is adapted to contact the distalmost end of the curved distal end 306 of the stomping shoe 302 to prevent overtravel of the stalk cutter downwardly through a slot 310 (FIG. 7) of the stomping shoe.

Figure 4:
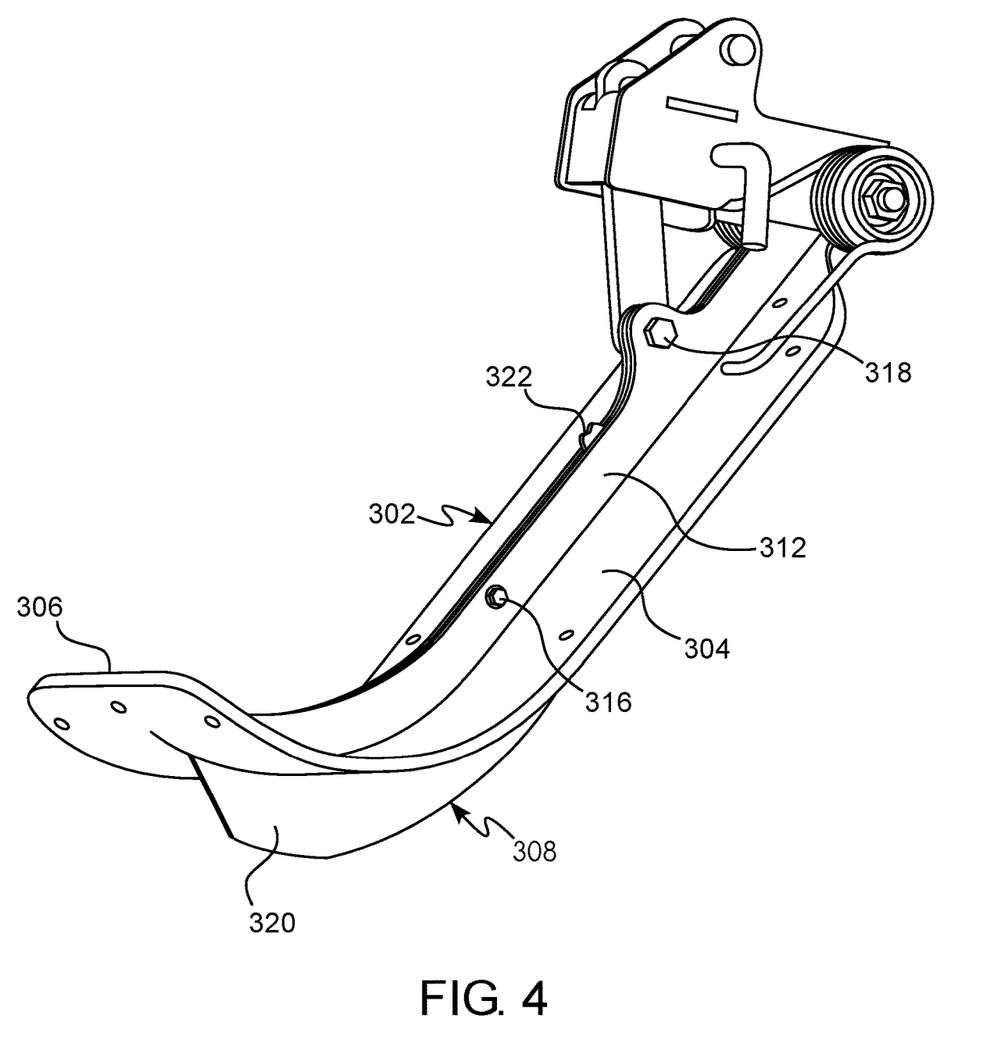
FIG. 4 is a perspective view of the stomping shoe assembly of FIG. 2 showing a stalk cutter of the stomping shoe assembly in a second position relative to a stomping shoe of the stomping shoe assembly.
Figure 5:
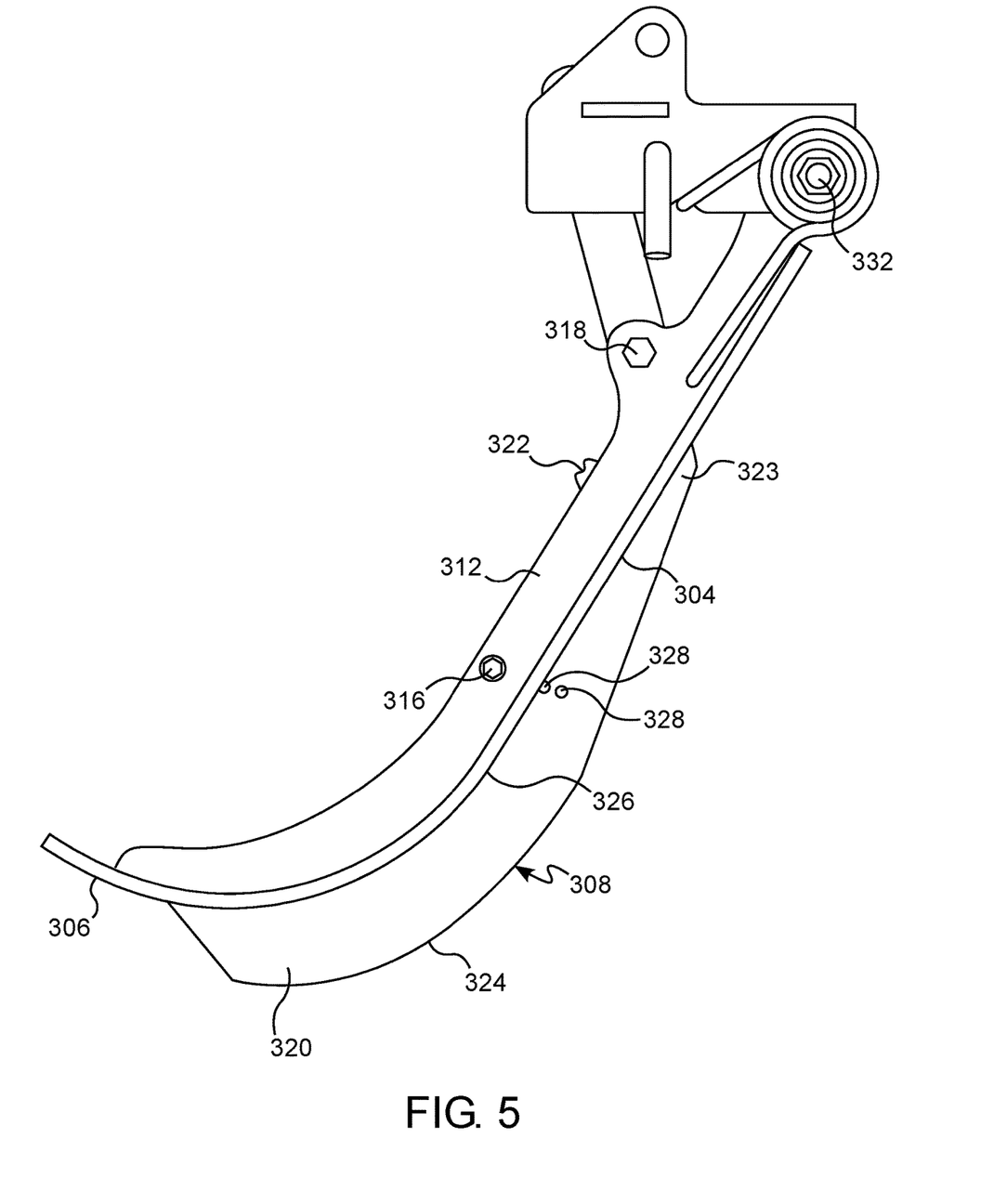
FIG. 5 is a side view of the stomping shoe assembly of FIG. 4.
Figure 7:
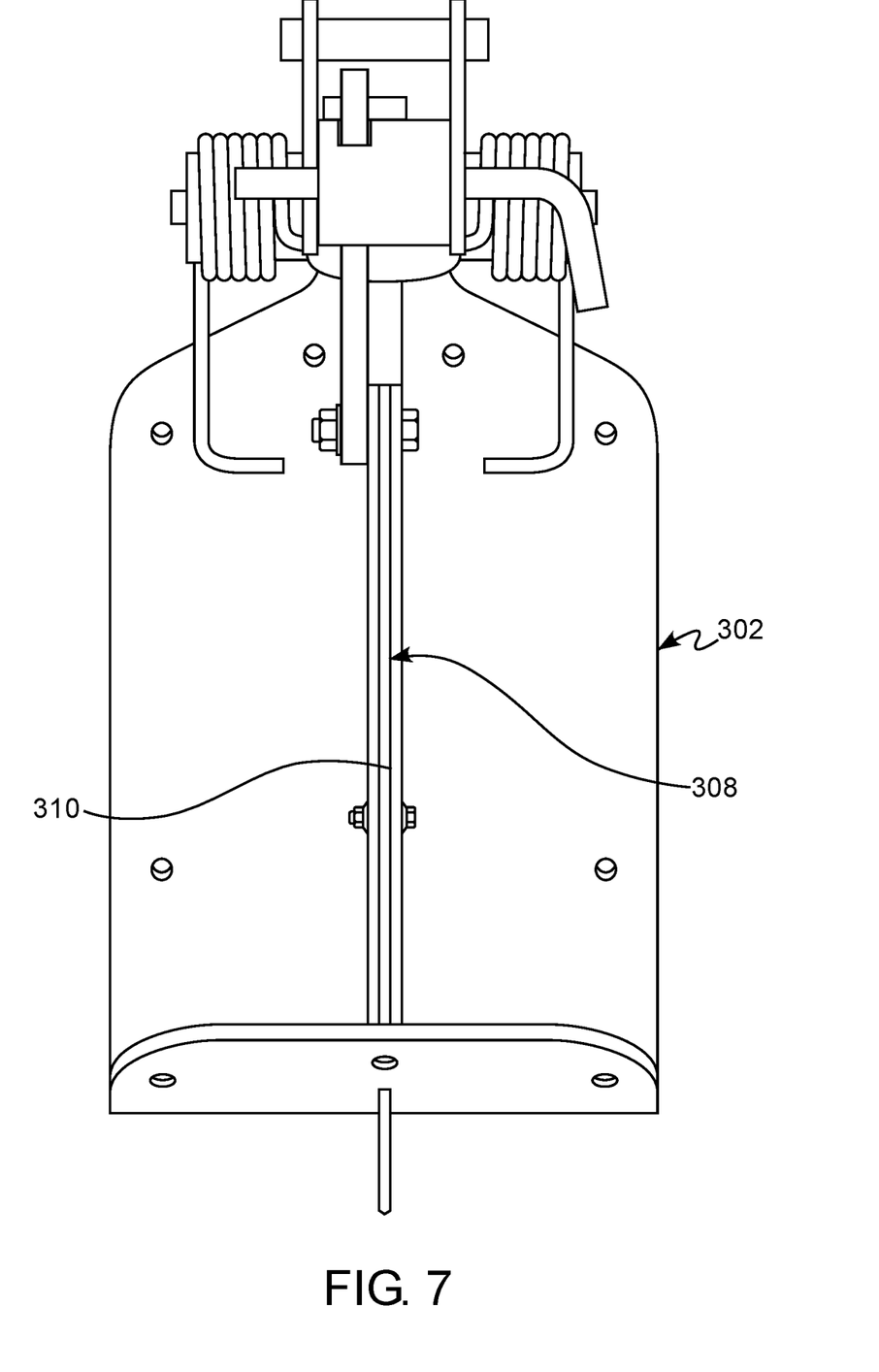
FIG. 7 is a front view of the stomping shoe assembly shown in FIG. 5.
Figure 8:
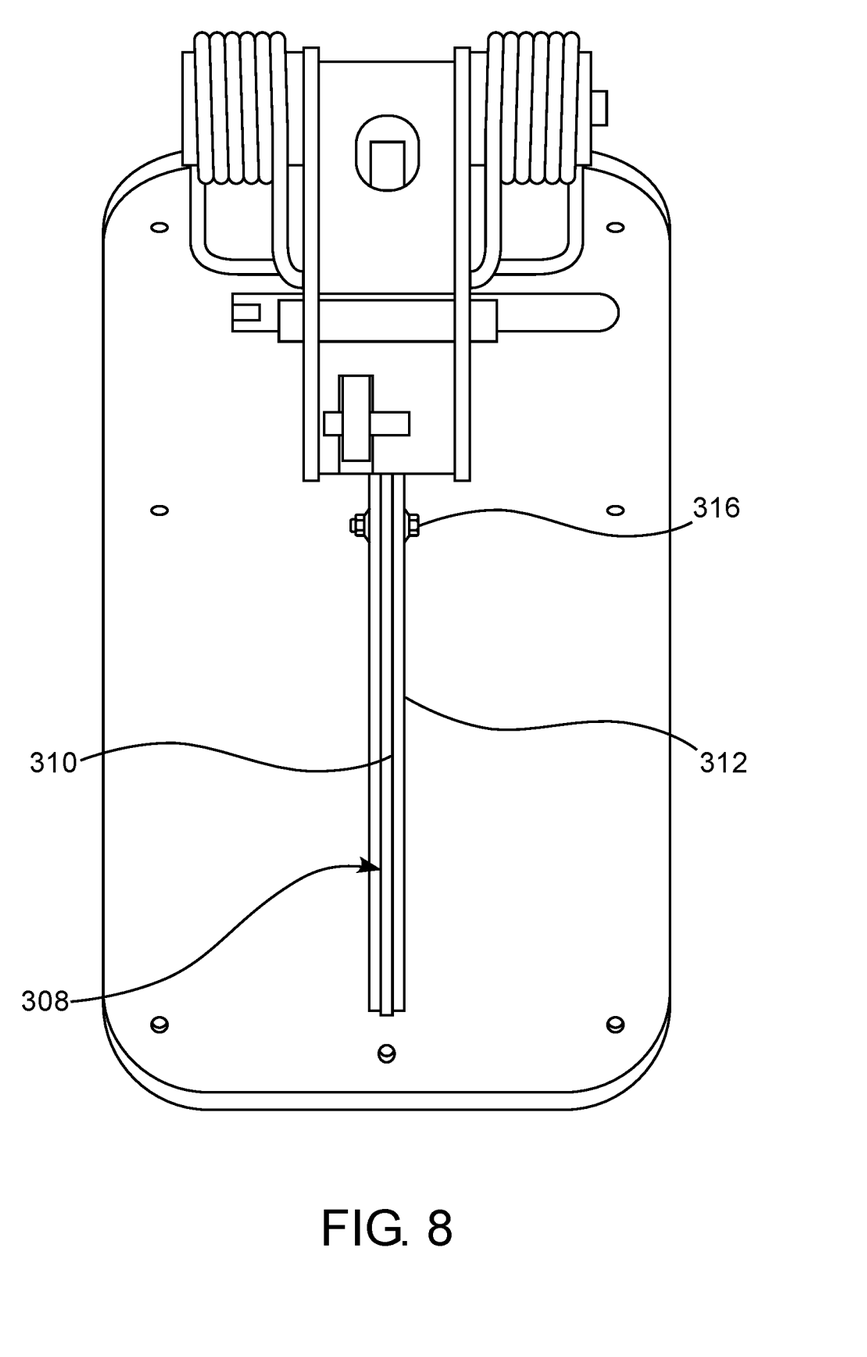
FIG. 8 is a top plan view of the stomping shoe assembly shown in FIG. 5.
Figure 9:
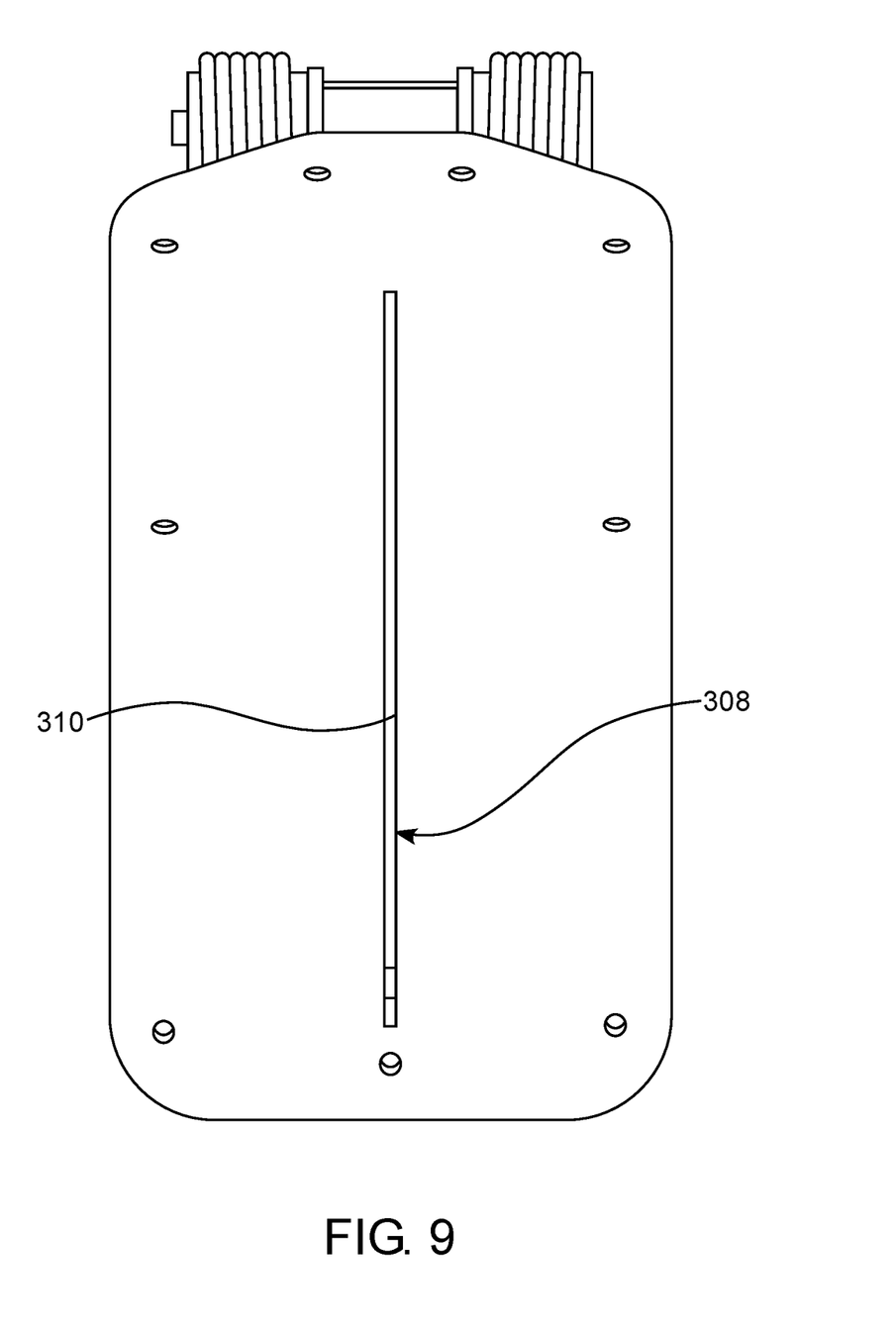
FIG. 9 is a bottom plan view of the stomping shoe assembly shown in FIG. 5.
Figure 10:
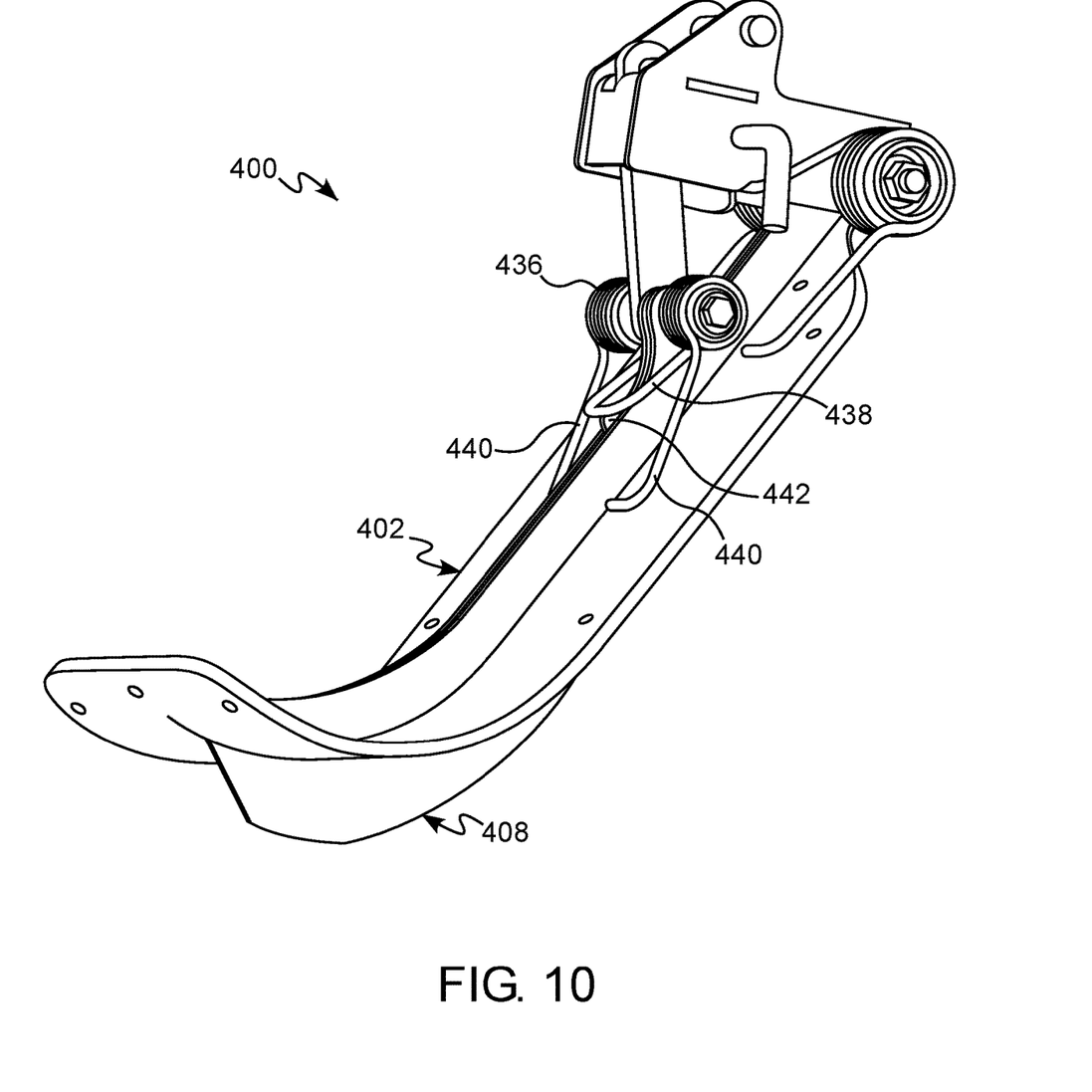
FIG. 10 is a perspective view of a second exemplary embodiment of a stomping shoe assembly in accordance with the subject disclosure.
Figure 11:
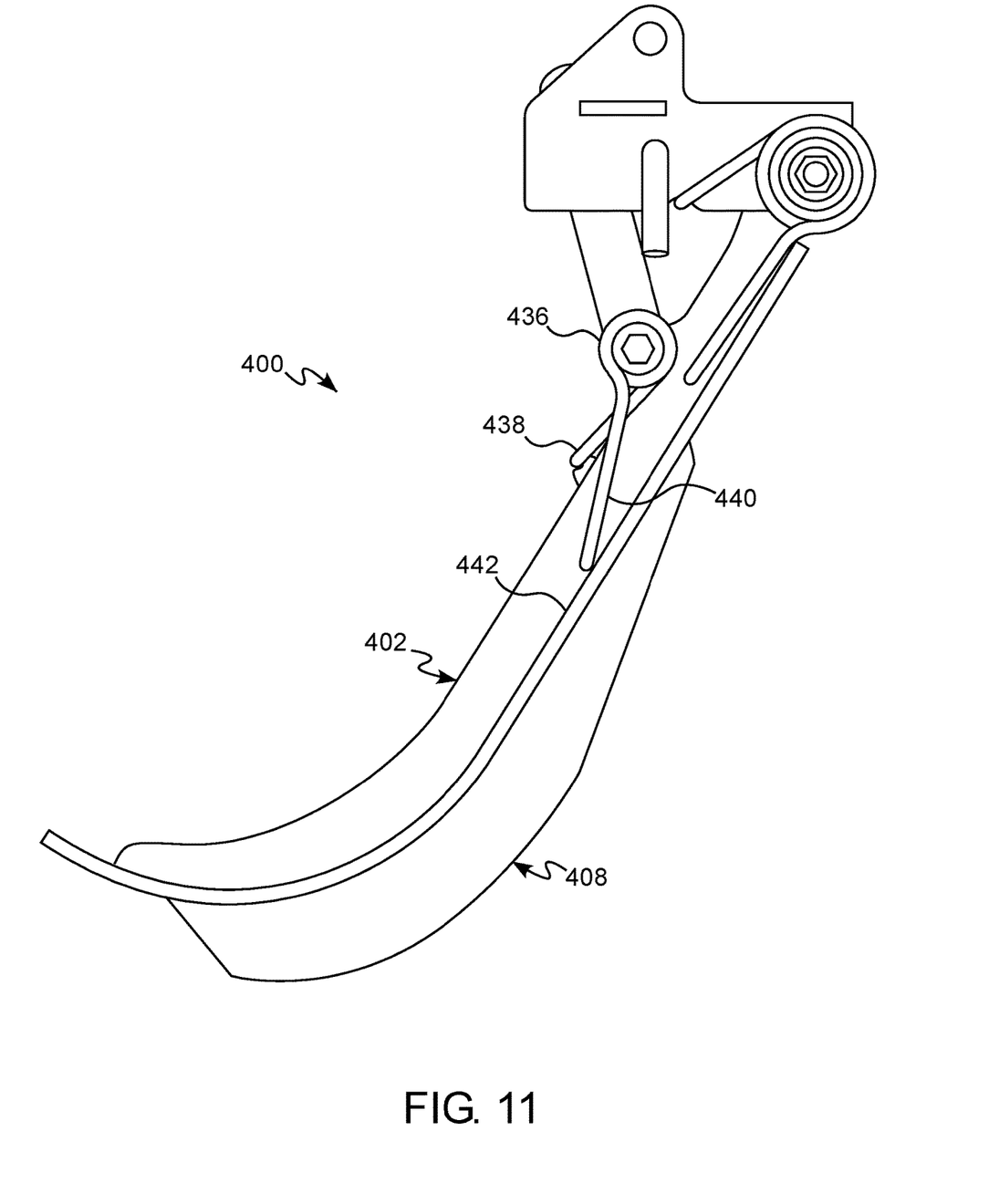
FIG. 11 is a side view of the stomping shoe assembly of FIG. 10.
Figure 12:
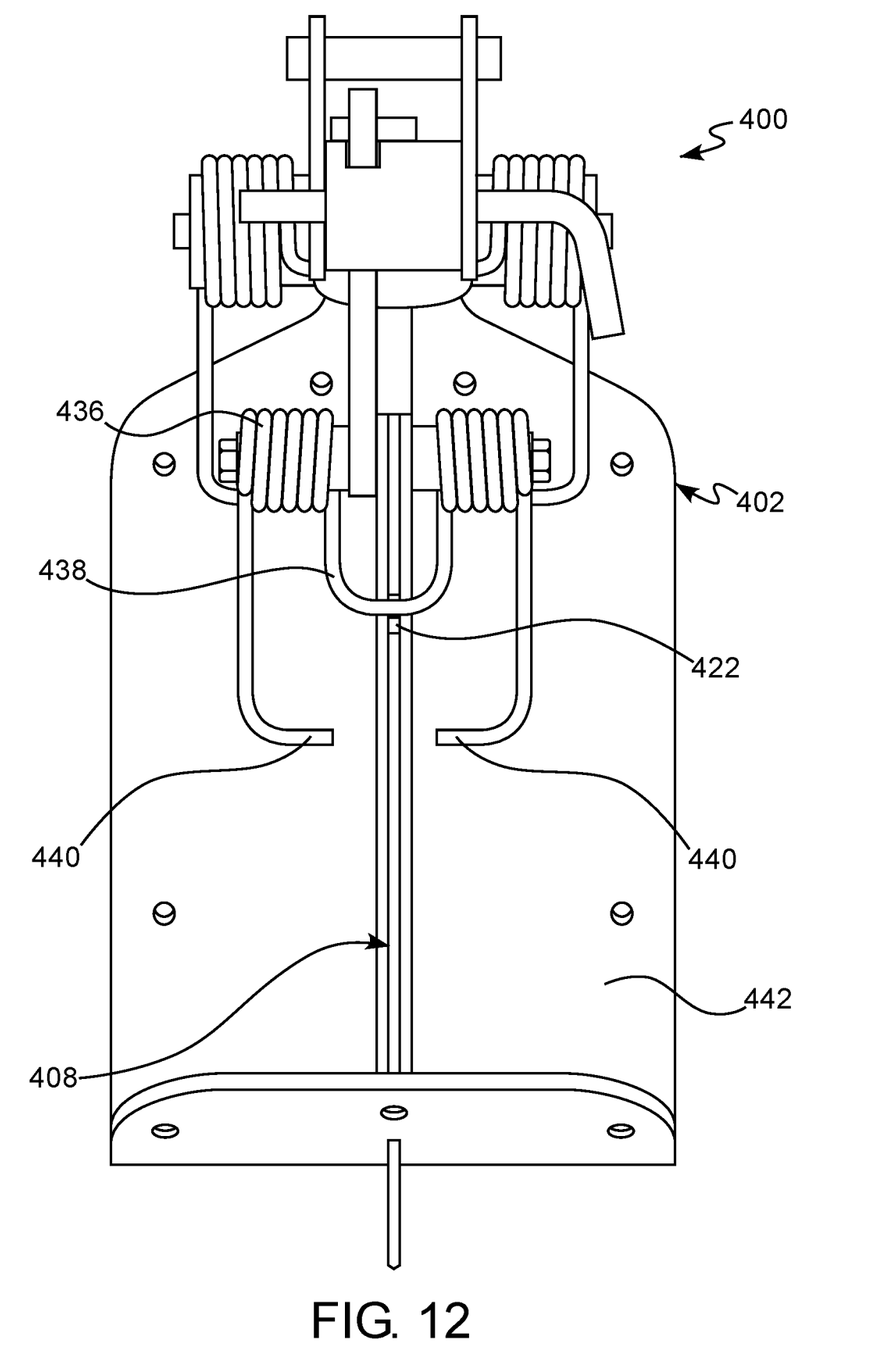
FIG. 12 is a front view of the stomping shoe assembly shown in FIG. 10.
Figure 13:
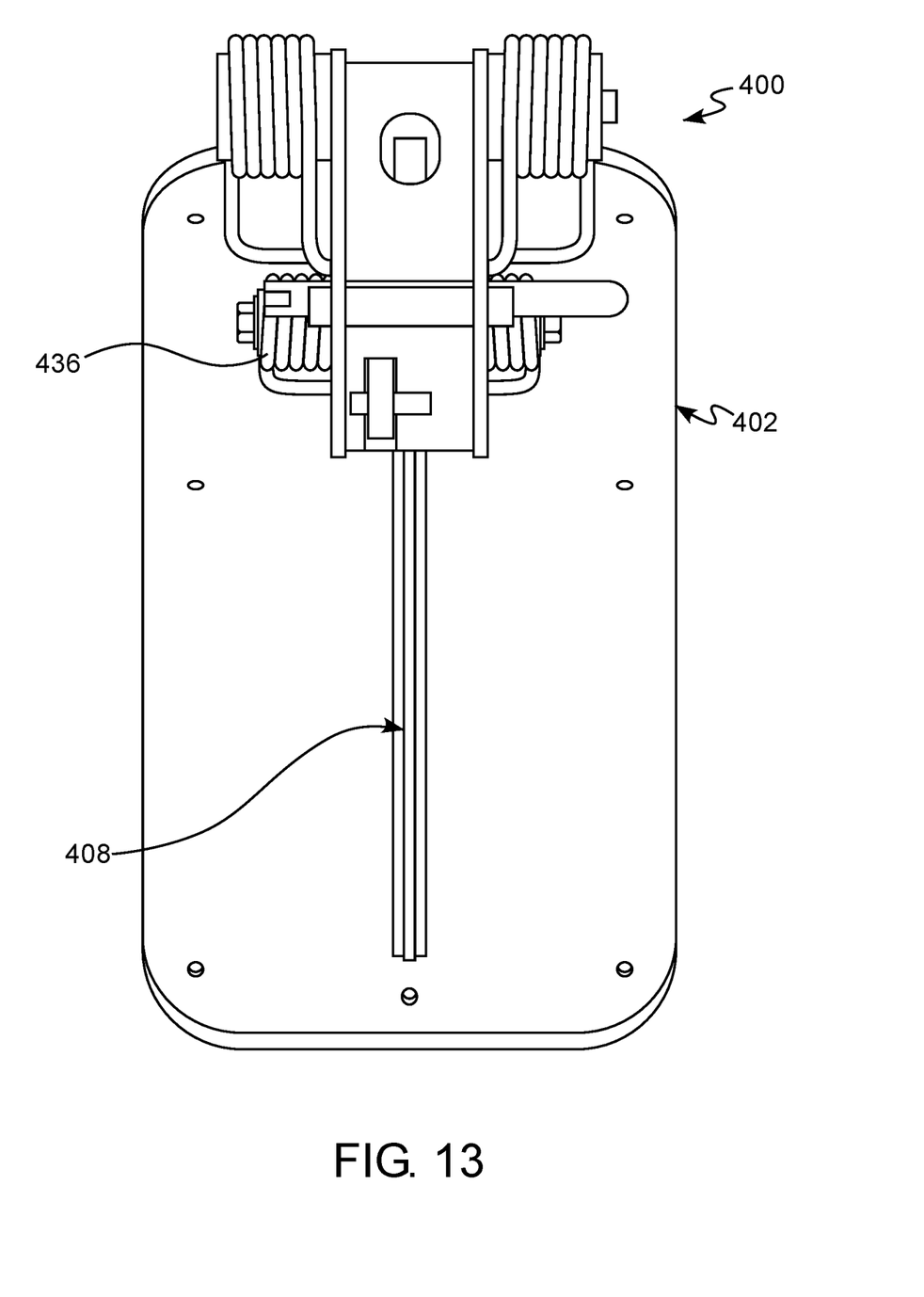
FIG. 13 is a top plan view of the stomping shoe assembly shown in FIG. 10.

As shown in FIGS. 7-9, the stomping shoe 302 includes the slot 310 sized to allow passage of the stalk cutter 308 therethrough. Referring to FIGS. 3-5, the stomping shoe further comprises a rib 312 extending along a longitudinal length of the stomping shoe, e.g., about its mid-line. The rib includes a fastener 316 about its mid-portion. The fastener can be, e.g., a through hole 314 in combination with a pin or shear bolt.

As shown in FIGS. 7-9, the stalk cutter 308 is a planar stalk cutter and is mounted with the slot 310. The stalk cutter further comprises a curved distal end 320 having a sharpened bottom edge for engaging crop, and a dorsal fin-like extension 322 about its proximal end 323 (FIGS. 4 and 5). FIG. 6 is a side view of the stalk cutter 308 which shows a through hole 325 located at the proximal end 323 for receiving a pivot 318, discussed below. Stalk cutter further includes a plurality of through holes 328, the function of which is described below.

Referring to FIG. 5, the stalk cutter 308 has a cross-sectional profile curve 324 that substantially matches a cross-sectional profile curve 326 of the stomping shoe 302, such that when the stalk cutter is fully retracted the stock cutter does not project downwardly from a bottom surface of the stomping shoe. The stalk cutter 308 is pivotable relative to the stomping shoe 302. According to an aspect, the stalk cutter 308 is pivotably connected to the stomping shoe 302 via a pivot 318 which passes through the through hole 325 of the stalk cutter.

In accordance with another aspect, the stalk cutter 308 comprises a plurality of through holes 328 substantially about its mid-portion (FIGS. 3, 5 and 6) for receiving the pin. Thus, the stalk cutter is movable about a plurality of positions through the slot 310 and fixable in position by the fastener 316. In other words, the through holes 328 are individually alignable with the stomping shoe rib through hole 314 to receive the pin therethrough such that the stalk cutter is fixed in position with the slot 310.

In this regard, the user can set a depth of extension of the stalk cutter 308 at several positions relative to the stomping shoe 302. When the corn stalks to be cut are relatively thick, the user can set the extension depth of the stalk cutter to be comparatively large. Conversely, when the corn stalks to be cut are thinner, the user can set the extension depth of the stalk cutter to be comparatively smaller. Further, if desired or necessary, the user can set the stalk cutter such that it does not extend from the stomping shoe. Additionally, as the stomping shoe and stalk cutter may encounter hard objects such as rocks or stones when traversing a field, it is preferable that fastener 316 include a shear bolt that shears when the stalk cutter encounters a hard object. As such, the stalk cutter can be freed to pivot upwardly so as to minimize damage to the stalk cutter and stomping shoe assembly.

Referring to FIGS. 10-13, there is shown a stomping shoe assembly 400 constructed in accordance with another exemplary embodiment of the subject disclosure. Stomping shoe assembly 400 is constructed similar to stomping shoe assembly 300. Accordingly, only those aspects of the stomping shoe assembly 400 that depart materially in structure and/or function from their counterparts in stomping shoe assembly 300, or are otherwise necessary for a proper understanding of the subject disclosure, will be discussed in detail.

In this regard, the stomping shoe assembly 400 comprises a stalk cutter 408 having a dorsal fin-like extension 422 about its proximal end and a biasing member 436 biasing a stalk cutter 408 relative to the stomping shoe 402. The biasing member 436 biases the pivotably mounted stalk cutter towards the extended position. In the illustrated embodiment, the biasing member is formed as a torsion spring having an inner end 438 in contact with the dorsal fin-like extension 422 and opposed outer legs 440 in contact with an upper surface 442 of the stomping shoe 402. It is understood that other types of biasing members may be used to bias the stalk cutter to extend from the stomping shoe including, without limitation, a compression spring, an elastomer, a leaf spring, and the like. Constructed as a spring, the biasing member 436 is also yieldable in the event the stalk cutter 408 encounters a hard object. In such an event, the stalk cutter is free to pivot upwardly against the bias of the biasing member so as to minimize potential damage to the stalk cutter.

According to an aspect, the stomping shoe assembly 300 further comprises a mount 330 (FIG. 3) for attaching to the agricultural harvester header 102. Further, the stomping shoe 302 is pivotably connected to the mount at pivot 332 (FIG. 5) so as to pivot about axis 334 (FIG. 3). It is to be understood that a similar mount may be used to attach the stomping shoe assembly 400 to the agricultural harvester header 102. According to an aspect, stomping shoe assembly 300 includes a cross bar 344 and the stomping shoe 302 is rotationally coupled to the cross bar 344 about a pivot axis 334. A torsion spring 346 is provided for biasing the stomping shoe 302 angularly about pivot axis 334 with respect to the cross bar 344, thereby urging a lower surface 347 of stomping shoe 302 along direction 348 and into the ground when being used in conjunction with a combine harvester. In other exemplary embodiments, the biasing force provided by the torsion spring may be provided by other means, such as, for example, a compression spring, an elastomer, a leaf spring and the like, positioned to provide an angular compression force between the cross bar 344 and the stomping shoe 302. The mount may also include a limit bar 350 and associated pins 352, 354 limit the angular travel of the stomping shoe 302 with respect to the cross bar 344, thereby preventing undesirable over-travel of stomping shoe along direction 348 and ensuring proper orientation of stomping shoe with respect to the ground when being used. Cross bar 344 is configured to releasably attach to a mounting bracket 356, for example, to facilitate expeditious replacement and/or maintenance of the stomping shoe. For this purpose, cross bar 344 is provided with a locking pin 354 and an engaging bar 358 for engaging a receptacle 360 of mounting bracket 356. To detach stomping shoe 302 for replacement or maintenance, the locking pin 354 is removed, thereby allowing engaging bar 358 to be displaced from engaging the receptacle 360 of the mounting bracket 356.

Although illustrated in the various embodiments as having a single stalk cutter pivotably received in the slot of the stomping shoe, it is to be understood that the slot of the stomping shoe may be of sufficient width to accommodate two or more pivotable stalk cutters, if such is desired or necessary.

The foregoing exemplary embodiments of the stomping shoe assembly advantageously cut and break down stalks and/or weaken stalks without the need for any or minimal additional power, e.g., horsepower from the harvester. As such, the foregoing provides a low cost means to consumers for addressing leftover stalks concurrently during harvesting operations. Consequently, the rate of decomposition of the cut stalks and clearing of the field for subsequent planting is accelerated.

It will be appreciated by those skilled in the art that changes could be made to the exemplary embodiments described above without departing from the broad inventive concept thereof. It is to be understood, therefore, that this disclosure is not limited to the particular exemplary embodiments disclosed, but it is intended to cover modifications within the spirit and scope of the subject disclosure as defined by the appended claims.

I claim:

1. A header for an agricultural harvester comprising:
   a chassis configured to mount to a forward end of the agricultural harvester;
   a row unit mounted to the chassis for processing crop; and
   a stomping shoe assembly mounted to the chassis, the stomping shoe assembly comprising:
   a stomping shoe having:
   a substantially planar longitudinally extending proximal end connected to the chassis,
   a curved distal end for engaging crop, and
   a rib extending along a longitudinal length of the stomping shoe, wherein the rib includes a through hole about its mid-portion; and
   a planar stalk cutter having an elongated body mounted to the stomping shoe and extending through the stomping shoe from the curved distal end and along the substantially planar longitudinally extending proximal end, the stalk cutter including:
   a curved distal end for engaging crop, and a plurality of through holes substantially about its mid-portion, wherein the stomping shoe includes a slot sized to allow the passage of the stalk cutter therethrough, and wherein the stalk cutter is pivotably connected to the stomping shoe by a fastener engaging the through hole on the rib and the through hole on the stalk cutter.

2. The header of claim 1, wherein the stalk cutter is extendable from the stomping shoe about a plurality of positions.

3. The header of claim 1, further comprising a biasing member biasing the stalk cutter.

4. A stomping shoe assembly for an agricultural harvester header comprising:
   a stomping shoe having:
      a substantially planar proximal end for connecting to an agricultural harvester header,
      a curved distal end for engaging crop,
      a rib extending along a longitudinal length of the stomping shoe, wherein the rib includes a through hole about its mid-portion, and
      a slot sized to allow the passage of the stalk cutter blade therethrough; and
   a planar stalk cutter blade having an elongated body mounted to the stomping shoe and extending from the stomping shoe from the curved distal end to the substantially planar proximal end, the planar stalk cutter blade comprising a curved distal end for engaging crop, and a plurality of through holes substantially about its mid-portion; and wherein the stalk cutter blade is pivotably connected to the stomping shoe by a fastener engaging the through hole on the rib and the through hole on the stalk cutter blade.

5. The stomping shoe assembly of claim 4, wherein the stalk cutter blade has a cross-sectional profile curve that substantially matches a cross-sectional profile curve of the stomping shoe.

6. The stomping shoe assembly of claim 4, further comprising a mount for attaching to the agricultural harvester header, and wherein the stomping shoe is pivotably connected to the mount.

7. The stomping shoe assembly of claim 4, wherein the stalk cutter blade is mounted within the slot.

8. The stomping shoe assembly of claim 4, wherein the stalk cutter blade further comprises:
   a dorsal fin-like extension about its proximal end.

9. The stomping shoe assembly of claim 4, further comprising a biasing member biasing the stalk cutter blade relative to the stomping shoe.

10. The stomping shoe assembly of claim 4, wherein the stalk cutter blade is extendable from the stomping shoe about a plurality of positions.

11. The stomping shoe assembly of claim 4, wherein the stalk cutter blade includes a stop at a distal end thereof adapted for contacting the curved distal end of the stomping shoe to prevent overtravel of the stalk cutter through the slot.

* * * * *